525-240 SR
XR T 856,020

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED NOVEMBER 12, 1968

856 O.G. 336

665,270

LAMINATING COMPOSITION OF A BLEND OF LOW MOLECULAR WEIGHT POLYETHYLENES AND ARTICLE OF MANUFACTURE

Raymond E. Sutherland and James G. Stranch, both % Tennessee Eastman Company, P.O. Box 511, Kingsport, Tenn. 37662

Filed Sept. 5, 1967. Published Nov. 12, 1968

Class 260—897

No Drawing. 8 Pages Specification

Laminated articles and a laminating composition for use therein. The laminating composition is in particulate form of (1) from about 40 to 60 percent by weight of a polyethylene having an average molecular weight of about 15,000 to 25,000 and a melt index of about 15–25, and (2) from about 40 to 60 percent by weight of a polyethylene having an average molecular weight of about 8,000 to 11,000 and a melt index of about 170–230. Each of the polyethylenes have a particle size of about 150–250 microns and the composition has a melt index of about 50 to 90. The composition is particularly suited for laminating fabric materials.